(12) United States Patent
Edelen, III

(10) Patent No.: US 12,499,494 B2
(45) Date of Patent: Dec. 16, 2025

(54) DYNAMICALLY CREATING THREE-DIMENSIONAL OBJECT FILES FOR COMPONENTS NEEDING TO BE REPLACED AT POINT OF NEED

(71) Applicant: KAIROS, Inc., Cailifornia, MD (US)

(72) Inventor: David Louis Edelen, III, Charlotte Hall, MD (US)

( * ) Notice: Subject to any disclaimer, the term of this patent is extended or adjusted under 35 U.S.C. 154(b) by 131 days.

(21) Appl. No.: 17/862,539

(22) Filed: Jul. 12, 2022

(65) Prior Publication Data

US 2023/0021899 A1    Jan. 26, 2023

Related U.S. Application Data

(60) Provisional application No. 63/221,105, filed on Jul. 13, 2021.

(51) Int. Cl.
*G06Q 50/04* (2012.01)
*G06Q 30/018* (2023.01)

(52) U.S. Cl.
CPC ........... *G06Q 50/04* (2013.01); *G06Q 30/018* (2013.01)

(58) Field of Classification Search
CPC .............. G06Q 50/04; G06Q 30/0621; G06Q 30/0643; G06Q 10/101; G06Q 30/018
See application file for complete search history.

(56) References Cited

U.S. PATENT DOCUMENTS

| | | | |
|---|---|---|---|
| 6,397,117 B1 | 5/2002 | Burrows | |
| 6,647,305 B1 | 11/2003 | Bigelow | |
| 7,818,148 B2 | 10/2010 | Carey | |
| 7,860,690 B2 | 12/2010 | Gadamsetty | |
| 8,566,066 B2 | 10/2013 | Thompson | |
| 8,589,128 B2 | 11/2013 | Buchowski | |

(Continued)

FOREIGN PATENT DOCUMENTS

| | | | | |
|---|---|---|---|---|
| CA | 3216808 A1 | * | 11/2022 | ....... G06Q 10/06395 |
| WO | WO-2019177606 A1 | * | 9/2019 | ........... B29C 64/393 |
| WO | WO-2021154244 A1 | * | 8/2021 | ........... B29C 64/386 |

OTHER PUBLICATIONS

Böhm, J., Marais, M. S., & Merwe, A. F. (2016). 3D printing dimensional calibration shape: Clebsch cubic (Year: 2016).*

(Continued)

*Primary Examiner* — Maria C Santos-Diaz
(74) *Attorney, Agent, or Firm* — Douglas J. Ryder; Ryder, Mazzeo & Konieczny LLC

(57) ABSTRACT

A method and system for dynamically generating object files for a component that needs to be replaced at time and location the component is needed. An operator can navigate a graphical user interface to select generic component types, representative of the overall component, and then generic configuration sub-types of the component. The operator is then able to input parameters to customize the component to their specific application. Design checking algorithms confirm the inputs are below predefined risk thresholds before generating the file for the component. The system enables less skilled operators (no computer aided design experience required) to create custom parts, while mitigating potential design risk. The object files (e.g., 3D object files) are then seamlessly sent to a 3-D printer's slicing algorithm and prepared for manufacture. The operator can then make the custom part when ready.

20 Claims, 10 Drawing Sheets

(56) References Cited

U.S. PATENT DOCUMENTS

| | | | | |
|---|---|---|---|---|
| 10,061,870 | B2* | 8/2018 | Nelaturi | B33Y 50/02 |
| 10,073,424 | B2* | 9/2018 | Lin | G06F 30/20 |
| 10,452,053 | B2* | 10/2019 | Lalish | G06F 30/00 |
| 11,257,297 | B1* | 2/2022 | Go | G06Q 30/0643 |
| 2004/0153824 | A1 | 8/2004 | Devarajan | |
| 2014/0074272 | A1 | 3/2014 | Cowden | |
| 2015/0331402 | A1* | 11/2015 | Lin | G05B 15/02 |
| | | | | 700/119 |
| 2018/0267518 | A1* | 9/2018 | Hassman | G05B 19/41845 |
| 2019/0070785 | A1* | 3/2019 | Kothari | B33Y 50/00 |
| 2019/0102815 | A1* | 4/2019 | Norman | G06Q 30/06 |
| 2021/0291458 | A1* | 9/2021 | Edelen, III | B29C 64/118 |
| 2022/0035358 | A1* | 2/2022 | Ponnada | G05B 23/0275 |
| 2022/0350945 | A1* | 11/2022 | Guerguis | G06F 30/17 |
| 2023/0032439 | A1* | 2/2023 | Gonzalez Martin | G06F 30/10 |

OTHER PUBLICATIONS

M. Campobasso and J. Gershenson, "Remote Design of Spare Parts for Local Manufacturing in Rural Kenya," 2020 IEEE Global Humanitarian Technology Conference (GHTC), Seattle, WA, USA, 2020, pp. 1-7, doi: 10.1109/GHTC46280.2020.9342926. (Year: 2020).*

N. Gupta, A. Tiwari, S. T. S. Bukkapatnam and R. Karri, "Additive Manufacturing Cyber-Physical System: Supply Chain Cybersecurity and Risks," in IEEE Access, vol. 8, pp. 47322-47333, 2020, doi: 10.1109/ACCESS.2020.2978815. (Year: 2020).*

* cited by examiner

DYNAMICALLY CREATING THREE-DIMENSIONAL OBJECT FILES FOR COMPONENTS NEEDING TO BE REPLACED AT POINT OF NEED

PRIORITY

This application claims the priority under 35 U.S.C. § 119 of Provisional Application Ser. No. 63/221,105, filed on Jul. 13, 2021, entitled "A Method and System for Dynamically Creating Three-Dimensional Object Files at a Point of Need with Additive Manufacturing", and having David Louis Edelen III as inventor. Application No. 63/221,105 is incorporated herein by reference in its entirety.

FIELD OF THE INVENTION

The present invention relates to the field of additive manufacturing, commonly referred to as 3-D printing. More specifically, a system that dynamically configures 3-D object files and analyzes risk, based on user inputs at the point of need, for parts to be additively manufactured.

BACKGROUND

The traditional supply chain consists of a complex network of suppliers, manufacturers, and distributors that interact with one another to produce a product for the consumer. This process has many interacting steps that take raw products and convert them into a usable form, creating a significant challenge to optimize for lower cost and faster production times. Each phase of the products transformation towards its end state requires transportation (typically on the global scale), increasing cost and slowing down delivery, only further complicating the system. Businesses as a result, order products in large quantities, which can take months to produce, only to store that inventory in order keep up with demand. This system also requires the business to produce as few variations as possible, as it only requires more resources to maintain the network with potentially lower demand.

Similarly, the sustainment of fleet systems can have complex logistics trails and increased cost due to reoccurring engineering work that is required. Technicians at the field level are required to reach back to engineering support teams whenever there is a design issue or change requested, no matter how trivial or minute the change can be. This can slow work down significantly as the information has to exchange through multiple teams, even possibly stopping work all together. Individual part cost is high due to low quantity production, potentially even a single one-off part. In the defense and oil industries, this can become even more challenging due to the remote locations of operation and limited resources available.

Fleet systems can also experience variations from on system to another due to wear, damage during use, documented and/or undocumented modifications/upgrades and other changes. This may result in one specific system having unique attributes even though it is an identical model as another specific system. As a result, field level repairs can be delayed resulting in longer downtime because the replacement component cannot be adjusted to conform to existing variations.

Modern technology is enabling the adaption of a disturbed manufacturing model, where products are created as close to the end user as possible. This decentralized method contains highly dispersed manufacturing units that are local to end users, and in some cases are the end users themselves. Distributed manufacturing can have higher unit cost due to the lower volume of production, but significantly simplifies logistics and production speed, ultimately saving time and money.

Advancements in materials and manufacturing technology are enabling additive manufacturing (3-D printing), to be leveraged for a true distributed manufacturing model to be realized. Initially, 3-D printing was used primarily in prototyping applications to produce fast and cheap representations of a part before manufacturing it with more expensive and higher volume manufacturing methods. This would enable designers to confirm that assemblies would fit together and look as intended before making the actual part. However, as the science and understanding of the process developed, 3-D printed parts became more functional, until it eventually they started being used for functional end use parts.

These advancements have provided a foundational leap in terms of manufacturing capability but is still left unleveraged in terms of the full potential in a truly distributed manufacturing model. One of the biggest gaps in the technology is the need for engineering involvement for part design and approval. A system that is capable of dynamically configuring components and checking the design against engineering best practices would significantly increase the local manufacturing capabilities and agility in a distributed manufacturing network.

SUMMARY

The present invention provides a system and method for dynamically configuring 3-D object files to be 3-D printed at the point of need. Operators can navigate a graphical user interface to select generic component representations from a variety of options. From there, the generic component representation can be customized with specific features for the intended application. Algorithms built into the 3-D object model generation tool will check the user's inputs against engineering best practices and manufacturing design rules to confirm the design is safe and manufacturable. From there, the user can preview the object on the graphical user interface. Upon the design accurately representing the intended part, the 3-D model can be generated, sliced, and automatically loaded into the 3-D printer control software for manufacture.

This system would be desirable in conditions where logistics support and resources are limited, constrained, or contested, such as in the defense, oil, remote island communities, and maritime industries, or in markets where highly specific products are required to be made in low quantities, such as in the medical industry for patient specific devices.

BRIEF DESCRIPTION OF THE DRAWINGS

The features and advantages of the various embodiments will become apparent from the following detailed description in which.

DETAILED DESCRIPTION OF THE EMBODIMENTS

In the following detailed description of embodiments section for the present invention, exhaustive specific details are delineated to provide a comprehensive understanding of the invention. However, it is apparent to a person skilled in art that the embodiments of invention may be practiced with or without each specific detail. As appropriate, well-known methods, procedures, and components have been described with limited detail in order to maintain focus on the embodiments of the invention.

Furthermore, it is obvious that the invention is not limited to only these embodiments. Any number of changes, variations, modifications, substitutions and/or equivalents will be apparent to those skilled in the art, without derailing the scope of the invention.

The present invention provides a method and system for creating dynamically configurable three-dimensional object files at the point of need to be fabricated with additive manufacturing. The method and system enable the user to pick from pre-defined generic configurations of components and input the specific parameters for the application, which are checked against design rules, in order to produce a safe and manufacturable component. The method is applicable to additive manufacturing methods such as material extrusion, material jetting, binder jetting, powder bed fusion, vat polymerization, sheet lamination, or direct energy deposition, or the like, but could also be used to produce 3-D object files that utilize other manufacturing methods such as milling, drilling, turning, casting, and the like.

Figure 1:
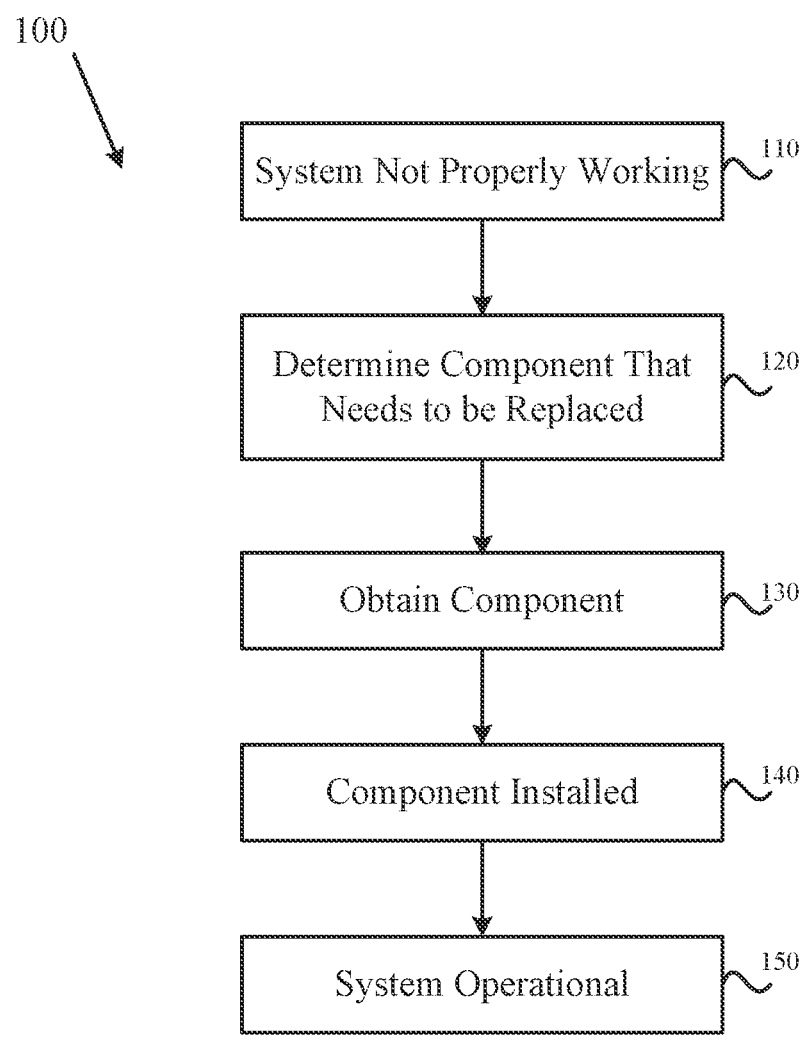
FIG. 1 illustrates a process flow of an example part replacement process for a system.

FIG. 1 illustrates a process flow 100 of an example part replacement process for a system. Initially, a system is determined to not be operating correctly 110. The system may be anything that is made up of a plurality of components. Depending on what the system is, not operating correctly may refer to various attributes, including but not limited to, the system being non-operational, not operating at full capacity, not being within defined tolerances, and/or not being within defined footprint. A technician working on the system may perform troubleshooting to determine which component or components are defective (e.g., worn out, broken, malfunctioning in some fashion) and need to be replaced 120. The technician investigates the issue and collects data for the component(s) that are to be replaced. A replacement component or components are then obtained 130 and installed 140. After the component(s) have been replaced the system can be brought back into proper operation 150.

Figure 2:
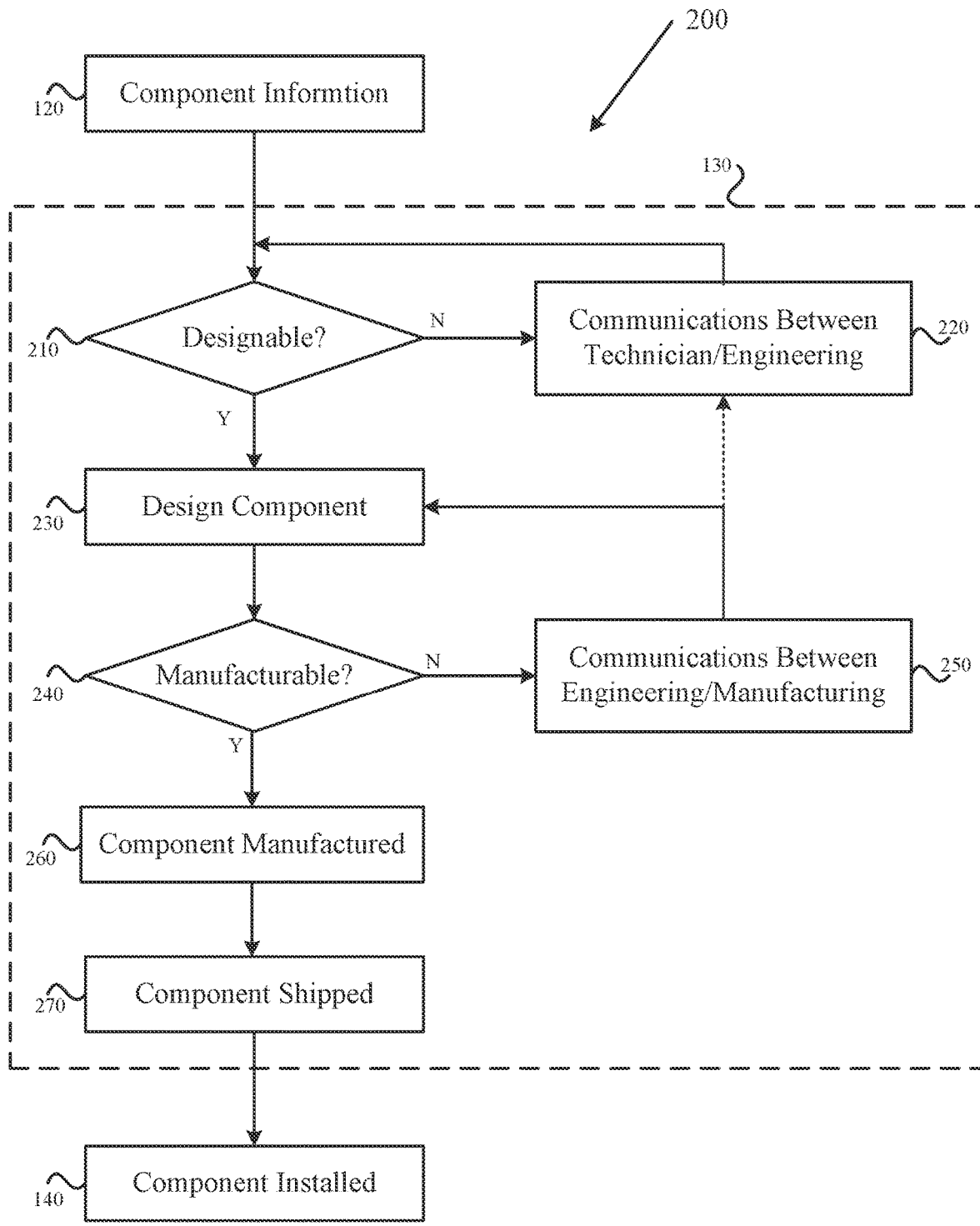
FIG. 2 illustrates a process flow of an example engineering support process for obtaining replacement components for a non-functioning system.

FIG. 2 illustrates a process flow 200 of an example engineering support process for obtaining replacement components 130 for a non-functioning system. Information about the component(s) that needs to be replaced is gathered 120. As noted above with respect to FIG. 1, the information may be gathered by, for example, a technician who determined the component(s) needed to be replaced. The information about the component(s) is relayed to an engineering team supporting the system in order for the engineering team to obtain (design) the component 130. A determination is made as to whether there is enough information to design the component(s) 210. If the component(s), or the issues associated with the component(s) or the system, are complex it is possible that the initial information provided by the technician was not sufficient (210 No). If the information was not sufficient, the engineering team and the technician may have further communication therebetween 220. Once the engineering team has suitable information (210 Yes) they can design the component(s) 230.

After the component has been designed, the design can be sent to a manufacturer. The manufacturer will make a determination whether the current design of the device can be manufactured within the constraints provided to them (e.g., timing, cost) 240. Typically, the manufacturer will quote a cost for the component to be fabricated based on delivery time and quantity, where faster times and lower qualities equate to higher cost. The manufacturer will also assess if the component design is manufacturable given the process. A design may not be able to be fabricated, for example, if a wall thickness is below the minimum capability of the manufacturing process. If there is an issue with the time or cost to manufacture the part, or the ability to manufacture the current design of the component (240 No), then the engineering team and the manufacturers may communicate therebetween 250. The communications may include ways to modify cost/schedule or to determine design changes that may be required for the component to be fabricated. Depending on the severity of the issue, the engineering team may have to reach back to the field technician for further information 220, greatly increasing the length of the timeline.

Once a determination is made that the component can be manufactured within the constraints provided (240 Yes), then the component can be manufactured at the requested quantity 260. Once manufactured, the manufacturer ships the component(s) to a defined destination 270. It should be noted that the shipping from the manufacturer may simply be an initial step in providing the component(s) to where they are needed. The components may need to be shipped several more times depending on how the logistics of the sustainment effort are networked. Upon receiving the component(s), the technician can install the component 140 in order to return the system to operation.

Often, the components in these situations are not overly complex in nature, but are very specific in their configuration, requiring engineering expertise to draft, design, evaluate structurally, evaluate material selection, or the like, to confirm the component will fulfill the designated requirements. The workflow 200 is illustrated with a sustainment example that is mechanical in nature but can be applied to other uses cases as well. Other explanations could be where the system could be the human body, where the same process would be required to replace a tooth or create a retainer in the medical industry, a broken part on an oil drilling rig, a broken arm rest on a transportation system, or the like.

Figure 3:
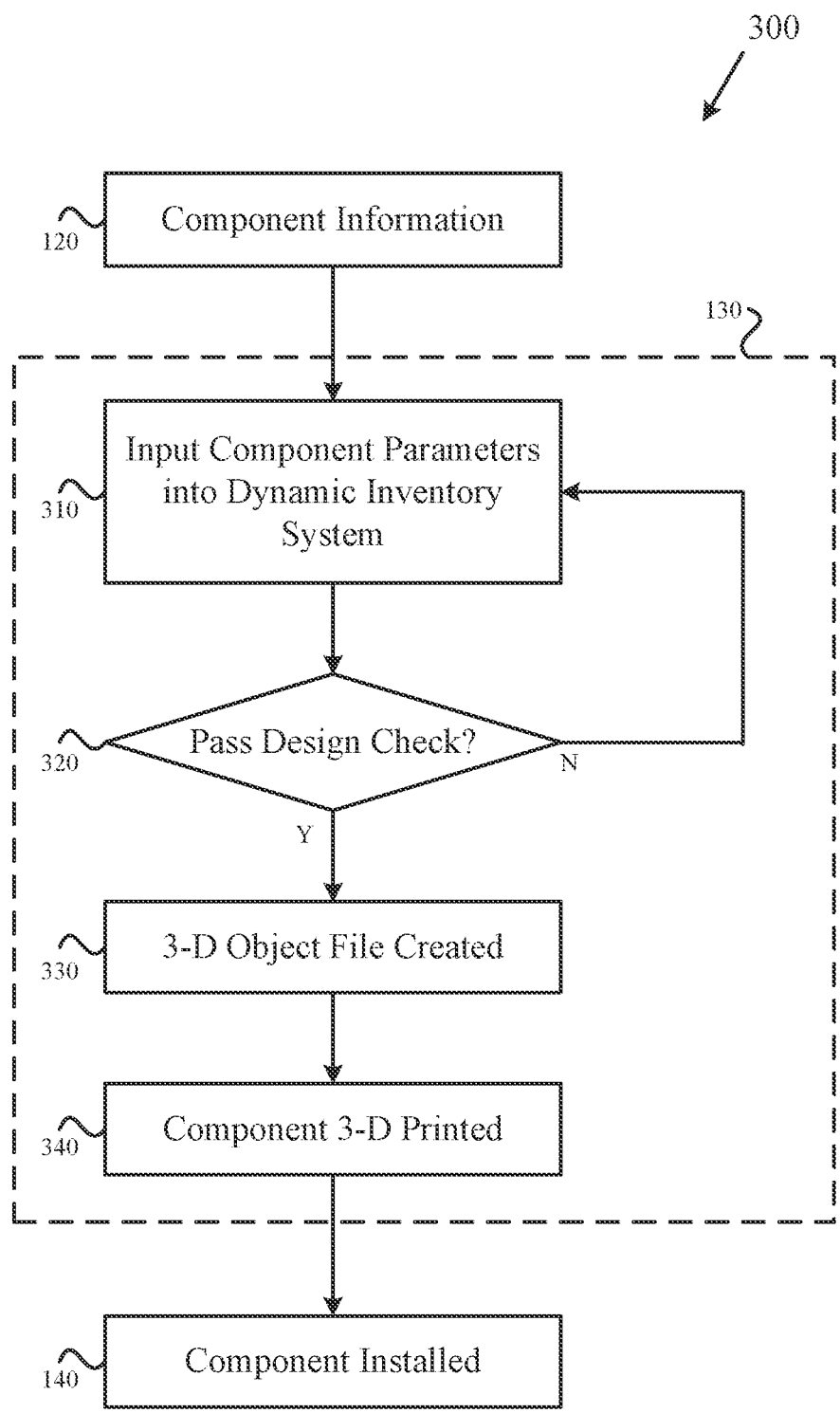
FIG. 3 illustrates a process flow utilizing an example dynamic inventory system for obtaining replacement components for a non-functioning system, according to one embodiment.

FIG. 3 illustrates a process flow 300 utilizing an example dynamic inventory system for obtaining replacement components 130 for a non-functioning system. Information about the component(s) that needs to be replaced is gathered by a technician 120. The technician can then activate a dynamic inventory system in hopes of having the component made. The dynamic inventory system may present the technician with a graphical user interface that may be used to input design parameters about the component into the system 310. The system can check the parameters input against predefined design rules to confirm that the configuration is reasonable, safe, and manufacturable based on known best engineering practices. If there is an issue with any of the design parameters (320 No), then the technician will be alerted, and the inputs must be adjusted. If the parameter inputs pass the design check (320 Yes), then a 3-D object file for the component that has been configured for this specific application will be generated 330. The 3-D object file could be STL, OBJ, FBX, COLLADA, 3DS, IGES, STEP, AMF, 3MF, or the like. The object file is then utilized to manufacture (e.g., 3-D print) the component 340. The manufactured component may then be installed in the system 140 to hopefully return the system to operation.

The process flow 300 is not limited to the specific steps and specific order described above. Rather steps may be added, deleted, modified, combined, split apart, or rearranged without departing from the current scope. One or more algorithms may be utilized to perform the processing functions defined therein. The one or more algorithms can be written in a programming language such as Python, Java, C#, C, C++, R, or the like. The algorithms may be stored in one or more storage mediums. The storage medium(s) may be located in (a) in a device manufacturing the components (3-D printer), (b) a computing device connected (via wired or wireless connection) to the manufacturing device, (c) a cloud-based medium, or (d) some combination thereof. The algorithms may be executed by one or more processors with access to the storage medium(s). The processor(s) may perform the defined functions when executing the algorithms. The processor(s) may be located in (a) a device manufacturing the components (3-D printer), (b) a computing device connected (via wired or wireless connection) to the manufacturing device, (c) a cloud-based medium, or (d) some combination thereof.

While the process flow 300 and the dynamic inventory system can be most effectively leveraged by being implemented with an additive manufacturing system, it is not limited to just additive manufacturing systems, and could be included in other forms such as integration into a computer numerical controlled milling machine, a standalone system, or the like.

Because the technician can interface with the dynamic inventory system directly, the process of producing a sustainment component is significantly faster given there are fewer required interactions. Additionally, although not specifically required, technologies such as 3-D printing can be leveraged to manufacture the part on site, further speeding up the process. Due to the design rules checking the input parameters in real time, the risk of a technician creating a part with insufficient design methodologies is mitigated. The dynamic inventory system may be designed so that the technician does not need to be familiar with computer aided design (CAD) software in order to utilize the system to design the component(s).

Figure 4:
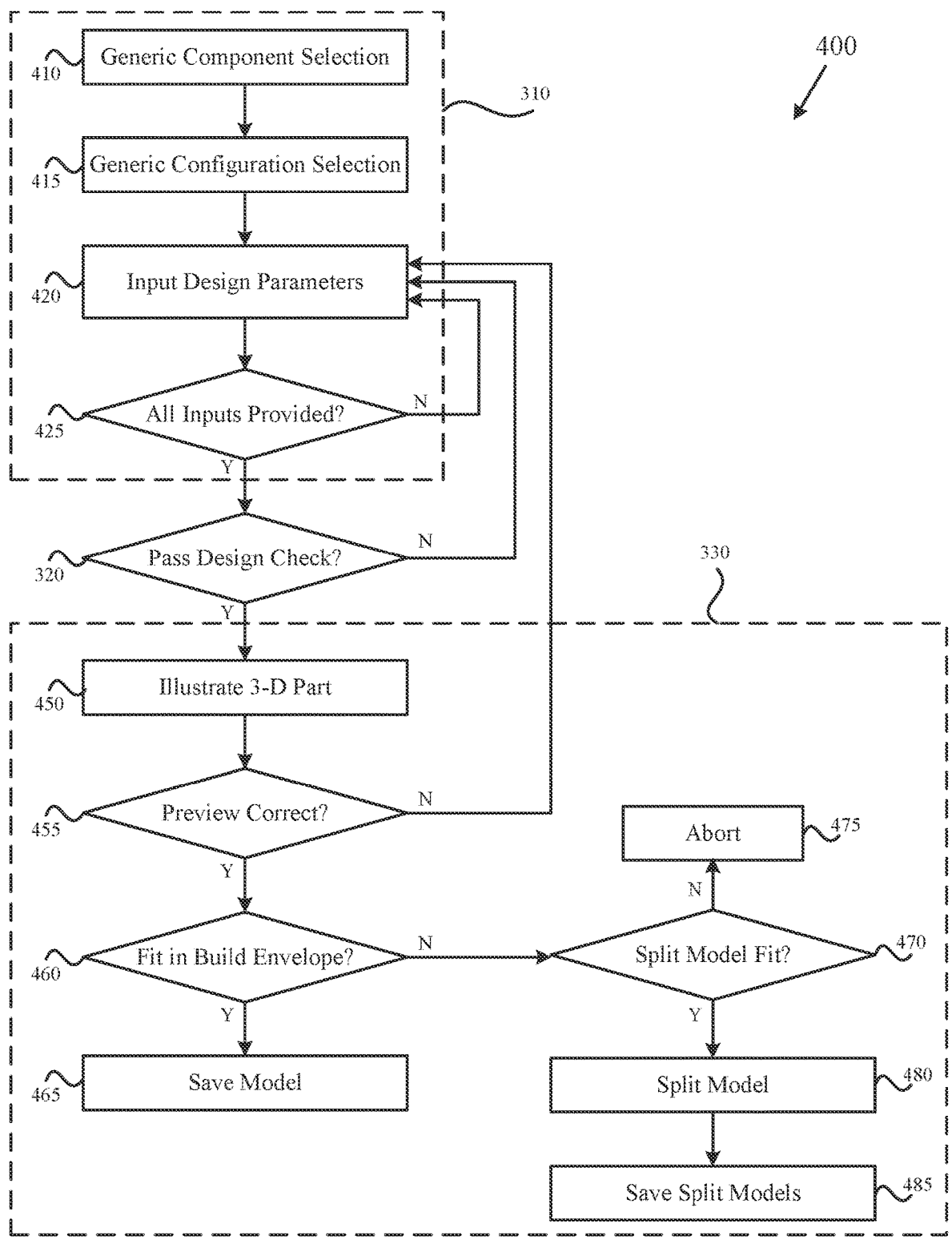
FIG. 4 illustrates a detailed process flow of utilizing an example dynamic inventory system for obtaining replacement components for a non-functioning system, according to one embodiment.

FIG. 4 illustrates a more detailed process flow 400 of utilizing an example dynamic inventory system. The process starts with the technician (system operator) inputting the component parameters into the system 310. The inputting may entail the system operator navigating a graphical user interface to select a generic component 410. The generic component could be a bracket, shaft, brace, retainer, seal, or the like. The generic component could represent a component type, category, class, group, classification, or the like. Upon selecting the initial generic component, the user is then given generic configuration options 415 that provide more specific possibilities of the component's make up. The generic configuration options may represent subclass, subcategory, or the like of the generic component. By way of example, the generic component could be a bracket and the generic configuration could be a mounting hole configuration therefore. The generic component could be a bushing and the generic configuration could with a taper or without a taper.

After selecting the generic component configuration type, the system operator can begin inputting the specific design parameters for the specific component being created 420. These parameters may include dimensions, environmental temperature ranges, structural loads, chemical exposures, or the like. The system then determines if all the appropriate inputs required to make the component have accurately been provided 425. If all the inputs have not accurately been provided (425 No), then the system notifies the operator that additional or corrected information is required so that the operator can enter the missing information or correct the inaccurate information 420. If all the inputs have accurately been provided (425 Yes), then the system will perform a design check on the information provided to determine if the design is sufficient 320.

The design checking algorithms are to ensure that risk is mitigated for the custom configuration entered by the system operator 420. The design rules are defined based on best known data and engineering practices. This may include checks such as ensuring a hole is positioned correctly, ensuring a component is sufficiently thick, maintain material compatibility with environmental conditions, or the like. If the component does not pass the design check (320 No), then the operator will be alerted that one or more parameters is insufficient and must be evaluated. The design checking algorithms may identify the issue, such as component too thin, holes in component too large or too close to edge, or the like. The checking algorithms may suggest possible inputs that conform to the rules, such as a minimal thickness, a material with a sufficient chemical resistance, maximum hole size, minimum distance hole must be from edge, or the like. Upon receiving the notification that the component did not pass the design, the user will then have to update at least some of the design parameters 420.

If the component passes the design check (320 Yes), then the system will proceed with generating the 3-D object file 330. Initially, the system may prepare a 3-D illustration of the 3-D object generated for the component and present the illustration to the system operator 450. The system operator may preview the 3-D illustration of the component to confirm it represents the desired component 455. It is possible that even though all the parameters have been accurately provided (425 Yes) and that the design passed the design check (320 Yes), that the component may be incorrect for the intended outcome. That is, when previewing the 3-D illustration of the component, the system operator may realize that, for example, a hole in a bracket is too small for a particular bolt size, or a shaft that is not long enough. If the previewed 3-D illustration of the component does not represent the component as intended by the system operator (455 No), then the system operator can navigate back to the parameter inputs 420 and correct one or more of the parameters.

If the previewed 3-D illustration of the component represents the component as intended by the system operator (455 Yes), then the system will check to make sure the design will fit within the build envelope of the given manufacturing machine the process is configured for 460. If the 3-D model can fit in the desired machine's build envelope (460 Yes), then the 3-D model is saved 465. The saved 3-D model can be exported, emailed, downloaded, or the like. If the 3-D model cannot fit in the desired machine's build envelope (460 No), then the system determines if the configuration allows the 3-D model to be split into multiple pieces without creating risk 470.

If the component cannot be split in a manner that does not create unnecessary risk (470 No), then the operation must be aborted 475 because the part is too large for the designated machine, and is either not possible to manufacture, or requires an alternative machine, method, or the like. If the component can be split in a manner that does not create unnecessary risk (470 Yes), then the model will be split based on predetermined methods 480. The split models can then be saved 485. The saved 3-D split models can be exported, emailed, downloaded, or the like.

The process flow 400 is not limited to the specific steps and specific order described above. Rather steps may be added, deleted, modified, combined, split apart, or rearranged without departing from the current scope. One or more algorithms (e.g., written in for example Python, Java, C#, C, C++, R) may be utilized to perform the processing functions defined therein. The algorithms may be stored in storage medium(s) and executed by processor(s). The storage medium(s) and the processor(s) may be located in (a) a device manufacturing the components (3-D printer), (b) a computing device connected (via wired or wireless connection) to the manufacturing device, (c) a cloud-based medium, or (d) some combination thereof. While the process flow 400 and the dynamic inventory system can be most effectively leveraged by being implemented with an additive manufacturing system, it is not limited to just additive manufacturing systems.

Figure 5:
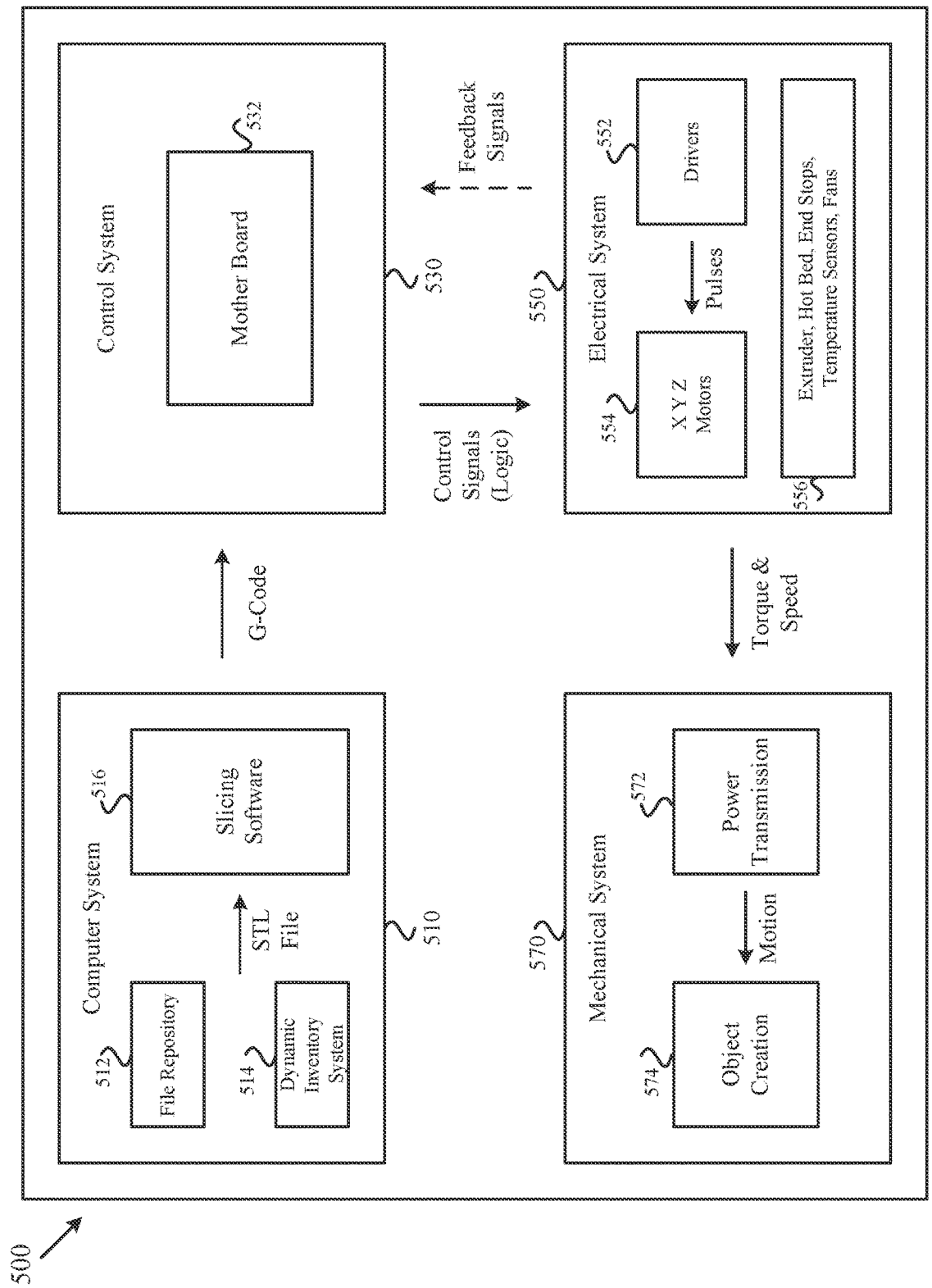
FIG. 5 illustrates a functional diagram of an example additive manufacturing system (3-D printer) implementing a dynamic inventory system, according to one embodiment.

FIG. 5 illustrates a functional diagram of an example additive manufacturing system (3-D printer) 500 implementing a dynamic inventory system. The system 500 includes a computing system 510, a control system 530, an electrical system 550 and a mechanical system 570. The computing system 510 may include one or more processors and one of more processor readable storage mediums. The one or more storage mediums may include instructions that when executed by the processor(s) cause the processors to take specific actions. The computing system 510 may be part of the system 500, may be an external component connected to the system 500 or some combination thereof.

The computing system 500 includes a file repository 512, the dynamic inventory system 514 and slicing software 516. The file repository 512 may include object files (STL files) for a plurality of components that were created and downloaded thereto. The components within the file repository 512 may have been created by individuals skilled in or familiar with CAD programs. The dynamic inventory system 514 provides a user unskilled/unfamiliar in CAD the ability to utilize a user interface to create custom components for certain standard type components as described above in FIGS. 3 and 4. The dynamic inventory system 514 creates object files (STL files) for the custom components that the technician defines. The slicing software 516 receives the STL files from either the file repository 512 or the dynamic inventory system 514 and creates the G-code therefrom. The G-code defines the process required to create the component.

The control system 530 controls the operation of the 3-D printer. The control system 530 includes a mother board 532. The control system 530 may receive the G-code for the component to be made and based on the G-code provide control signals (logic) to the electrical system 550. The control signals may control various elements of the electrical system 550. The electrical system 550 may provide feedback signals to the control system 530 that the control system 530 utilizes to possibly modify the control signals.

The electrical system 550 includes drivers 552, motors 554 and other items 556 including, but not limited to, an extruder, hot bed, end stops temperature sensors and fans. The drivers 552 provide the necessary pulses to the motors 554. The motors 554 may include a motor for each axis (x, y, z) or one or more motors may be utilized alone or in conjunction to control movement in x, y and z directions. The control signals may control the operation of the other items 556 including, but not limited to when and where to have the extruder extrude the filament, what temperature to have the heat bed, and when to turn the fans on. The temperature sensors may provide temperature measurements to the control system 530 as part of the feedback provided to the control system 530.

The torque and speed of the motors 554 is provided to the mechanical system 570. The mechanical system may include a power transmission 572 that moves the extruder (shown under electrical system). The movement and operation of the extruder may result in the object (component) being created 574.

Figure 6:
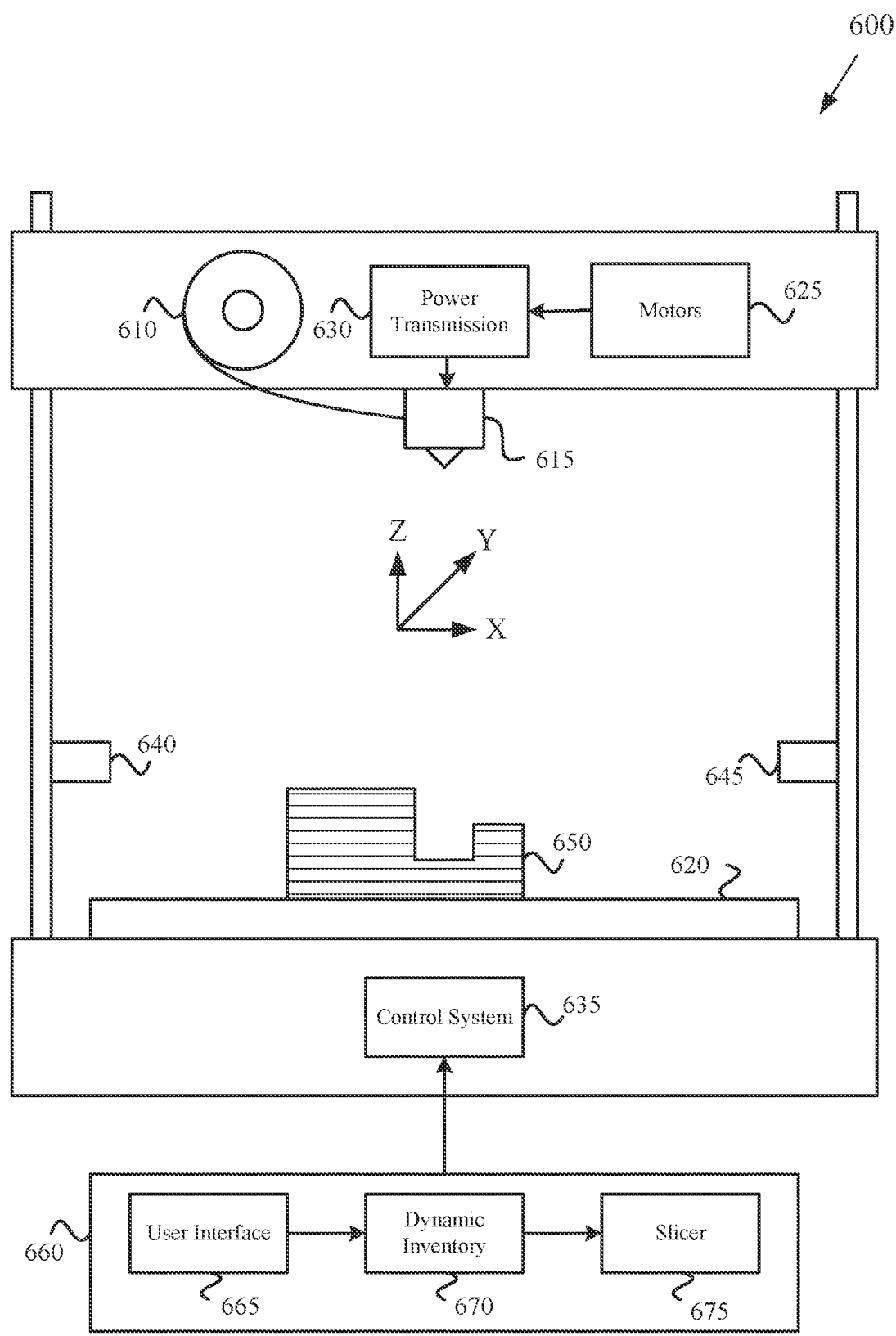
FIG. 6 illustrates a block diagram of an example additive manufacturing system (3-D printer) implementing a dynamic inventory system, according to one embodiment.

FIG. 6 illustrates a block diagram of an example additive manufacturing system (3-D printer) 600 implementing a dynamic inventory system. The 3-D printer 600 includes a spool of filament 610 (e.g., thermoplastic) or the like that is supplied to an extruder 615. The extruder 615 heats the filament 610 to a liquid state and extrudes the liquid filament onto a build platform 620. The build platform 620 may be heated (a hot bed). The extruder 615 is moved in any of the x, y or z planes via motors 625 and a powered transmission 630. The 3-D printer 600 may include temperature sensors 640 and/or fans 645. A control system 630 controls the operation of the printer 600. The control system 600 utilizes a g-code file for a component to control movement of the extruder 615 in order to create the desired component 650 layer by layer.

The 3-D printer 600 includes a computing system 660 for providing the dynamic inventory system. The computing system 660 may include a user interface 665 (e.g., display, keyboard, mouse) that can be used by the technician to enter information about the component that they desire to produce. The computing system 660 may also include one or more processors and one of more processor readable storage mediums. The one or more storage mediums may include instructions that when executed by the processor(s) cause the processors to take specific actions (for example, those discussed above in FIGS. 3-4). A dynamic inventory function 670 provides a graphical user interface that may be used to input design parameters about the desired component. The dynamic inventory function 670 also confirms that the component can safely be made and can be produced as one or multiple builds. Once the dynamic inventory function 670 confirms the design it creates the object (e.g., STL) for the component. The object file is provided to a slicer function 675 that generates the G-code for the component and provides that to the control system 635.

The computing system 660 may be part of the printer 600, may be one or more external components connected to the printer 600 or some combination thereof.

Figure 7:
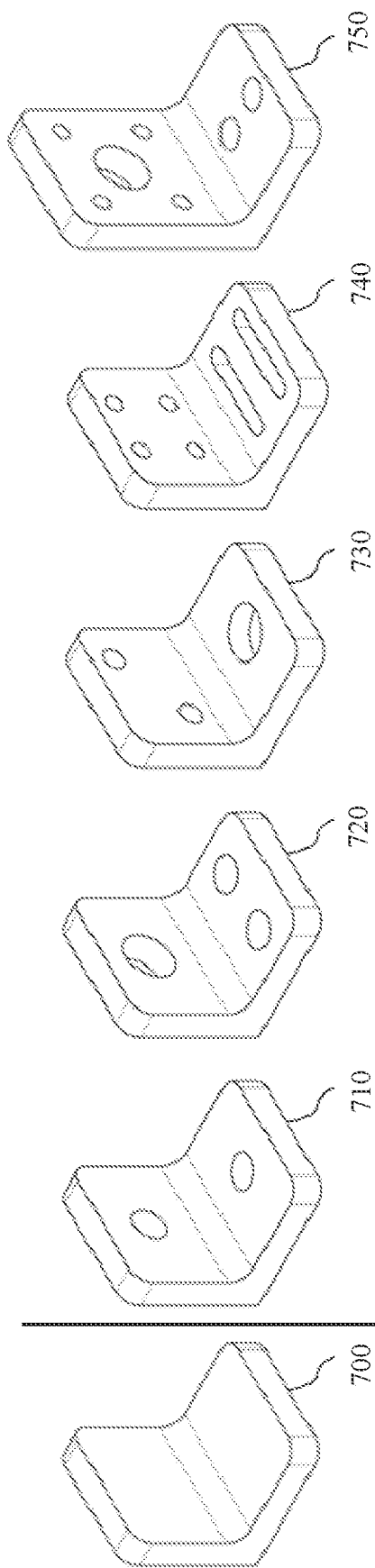
FIG. 7 illustrates an example generic bracket that may be selected from a graphical user interface of the dynamic inventory system and a plurality of example generic configurations that may be selected therefor, according to one embodiment.

FIG. 7 illustrates an example generic component 700 that may be selected from a graphical user interface of the dynamic inventory system (410 of FIG. 4) and a plurality of example generic configurations 710-750 that may be selected for the generic component (415 of FIG. 4). As illustrated, the generic component 700 is a bracket and the generic configurations 710-750 are different hole/slot arrangements therefore. Generic configuration 710 includes a single hole in both vertical and horizontal portions of the bracket. Generic configuration 720 includes a single hole in a vertical portion and two colinear holes in a horizontal portion. Generic configuration 730 includes two diagonally oriented holes in a vertical portion and a single hole in a horizontal portion. Generic configuration 740 includes four holes on a vertical portion and two slits in a horizontal portion. Generic configuration 750 includes four holes surrounding a center hole on a vertical portion and two colinear holes in a horizontal portion.

The generic configurations 710-750 are not limited to those illustrated. The generic configurations of the bracket could include various arrangements of holes, slots or the like that may be fairly common therefore. The generic configurations can also include a variety of dimensional features (e.g., longer vertical portion, longer horizontal portion). Once the generic component (410 of FIG. 4) and genic configuration (415 of FIG. 4) are selected the technician may customize the component for the specific need (420 of FIG. 4). The customization may include, for example, size of the horizontal and vertical portions of the bracket, and location and size of the holes/slits in the horizontal and vertical portions of the bracket. The selection of a generic component, followed by a generic configuration therefore and then the specifics of the component enables the system operator to quickly and simply design the component. Detailed information is only required once a series of simple choices are made, wherein the operator could have limited design knowledge, but able to arrive at the right configuration through image association techniques, image matching techniques, or the like.

Figure 8:
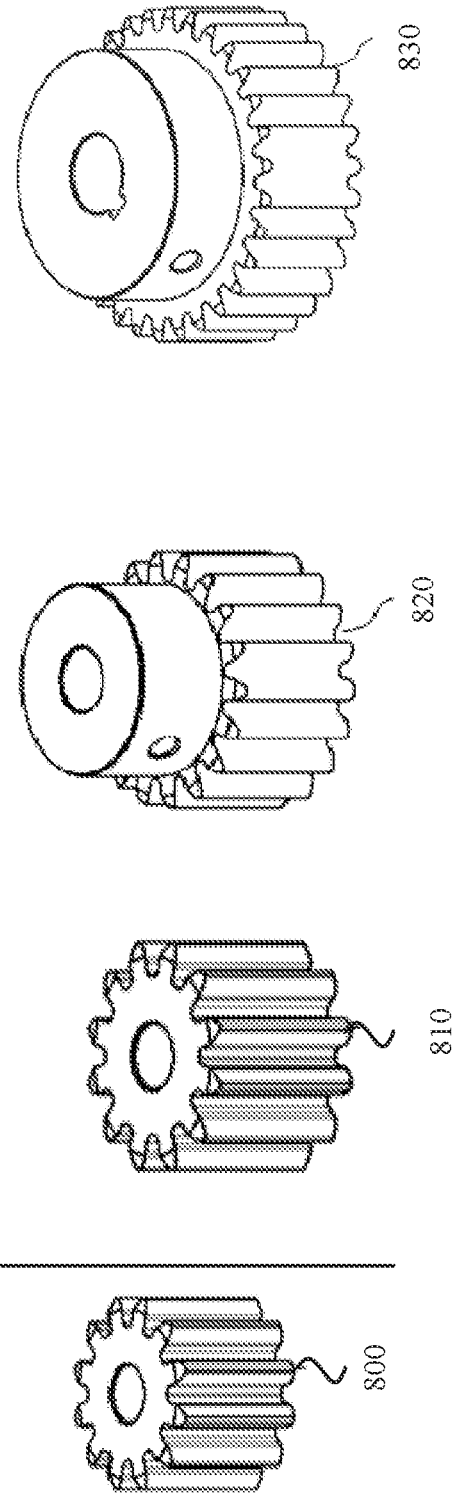
FIG. 8 illustrates an example generic gear that may be selected from a graphical user interface of the dynamic inventory system and a plurality of example generic configurations that may be selected therefor, according to one embodiment.

FIG. 8 illustrates an example generic component 800 that may be selected from a graphical user interface of the dynamic inventory system (410 of FIG. 4) and a plurality of example generic configurations 810-830 that may be selected for the generic component (415 of FIG. 4). As illustrated, the generic component 800 is a gear and generic configurations 810-830 defining whether a hub is included or not and if a hub is included what type of hub. The generic configuration 810 does not include a hub as the gear may be an idler gear. The generic configuration 820 includes a hub for securing the gear to a shaft. The generic configuration 830 includes a keyed hub for securing the gear to a shaft.

The generic configurations 810-830 are not limited to those illustrated. The generic configurations of the gear could include various tooth types (e.g., size, style), hub types or the like that may be fairly common therefore. Once the generic component (410 of FIG. 4) and genic configuration (415 of FIG. 4) are selected the technician may customize the component for the specific need (420 of FIG. 4). The customization may include, for example, thickness of the gear, number of teeth, pressure angle of the teeth, material the gear is made of, or the like.

Figure 9:
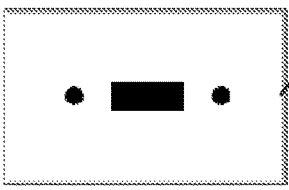
FIG. 9 illustrates an example generic switch plate cover that may be selected from a graphical user interface of the dynamic inventory system and a plurality of example generic configurations that may be selected therefor, according to one embodiment.
Figure 9:
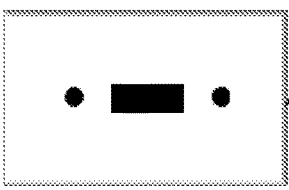
Figure 9:
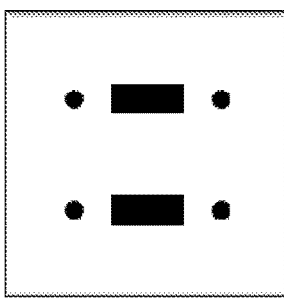
Figure 9:
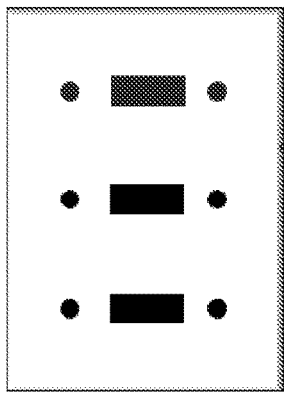

FIG. 9 illustrates an example generic component 900 that may be selected from a graphical user interface of the dynamic inventory system (410 of FIG. 4) and a plurality of example generic configurations 910-930 that may be selected for the generic component (415 of FIG. 4). As illustrated, the generic component is a switch plate cover, and the generic configurations are the number of switch openings (e.g., 1, 2 or 3). The generic switch plate configurations 910-930 include predetermined dimensions according to national standards, international standards, or the like, such as National Electrical Manufacturers Association compliant switch plate covers. The generic configurations 910-930 are not limited to those illustrated (number of openings). The generic configurations could include the type of openings such as those for standard switches, dimmer switches, different switch configurations, switches and outlets together, or the like that may be fairly common therefore. Once the generic component (410 of FIG. 4) and genic configuration (415 of FIG. 4) are selected the technician may customize the component for the specific need (420 of FIG. 4). The customization may include, for example, number of switches, type of switches, configuration of switches, inclusion of other elements with the switches, or the like.

As described above, the dynamic inventory system enables a technician to select generic components, generic configurations for the components and then define specific parameters for the components. The specific parameters may be modifications to what the original component was based on conditions and/or actions that may have been taken in the field.

Figure 10A:
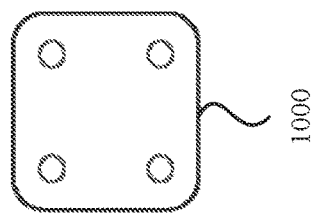
FIG. 10A illustrates example field specific changes that occurred to an original component that may need to be accounted for with a dynamic inventory system, according to one embodiment.
Figure 10A:
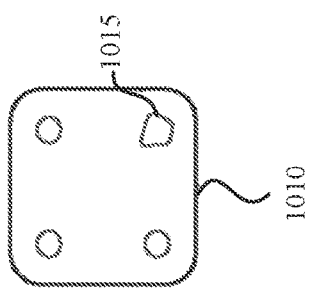
Figure 10A:
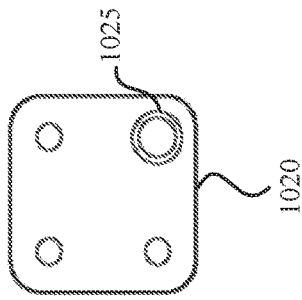

FIG. 10A illustrates example field specific changes that occurred to an original component. The original component was a plate 1000 with four holes (e.g., threaded) formed therein. During the course of using the plate 1000 within a system, the lower right hole 1015 was compromised in some fashion (e.g., hole cracked, threads stripped) such that the threaded hole was not usable, and the plate became a defective plate 1010. Before the defective plate 1010 could be replaced, the lower right hole was taped (expanded) and a threaded insert 1025 was inserted therein to provide a modified plate 1020. The modified plate 1020 may require a larger screw to be utilized to secure the plate within the system.

Figure 10B:
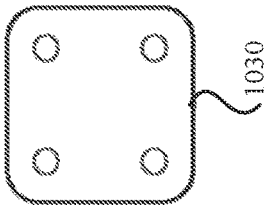
FIG. 10B illustrates example replacement components that could be generated based on field specific changes using the dynamic inventory system, according to one embodiment.
Figure 10B:
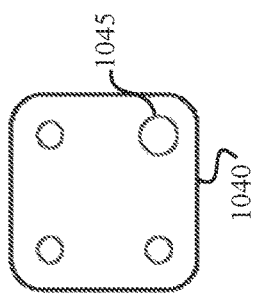

FIG. 10B illustrates example replacement components that could be generated using the dynamic inventory system. The technician could enter parameters associated with the original part 1000 so the replacement part 1030 has four equal sized threaded holes. Alternatively, the technician could enter parameters associated with the modified component 1020 so that the replacement part 1040 has a lower right threaded hole 1045 that is larger than the rest. Which replacement part 1030, 1040 the technician decides to design and fabricate may depend on whether it is desirable to use an original sized screw (assuming available), or a larger sized screw as was being used with the modified component 1020.

Figure 11:
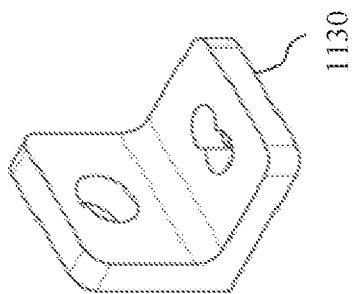
FIG. 11 illustrates various custom designs of a generic bracket having a generic configuration created based on the input of the technician that may include issues that do not pass a design check, according to one embodiment.
Figure 11:
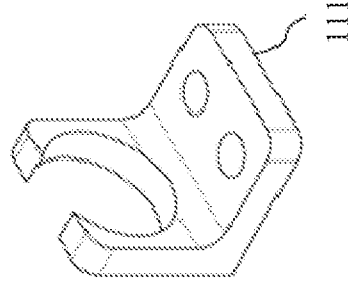
Figure 11:
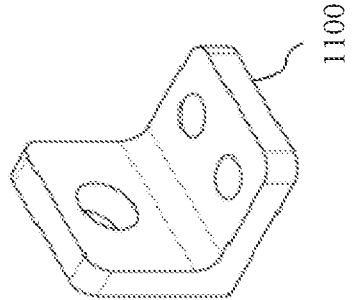

FIG. 11 illustrates various custom designs of a generic bracket having a generic configuration created based on the input of the technician (310 of FIG. 3, 410-420 of FIG. 4) that may include issues that do not pass a design check (330 of FIGS. 3 and 4). The generic component/generic configuration is a bracket having a single hole on a vertical portion and two colinear holes on a horizontal portion (e.g., 720 of FIG. 7). While the dynamic configuration system may provide valid ranges for various parameters that may be customizable it is still possible that the user (presumably untrained in engineering), may select a combination of parameter ranges that result in a risky component.

A first example of a custom bracket 1100 is a bracket that would pass the design check. That is, the design parameters are with specification dimensions. The specifications may include, for example, the horizontal and vertical portions having a sufficient thickness, the various holes have diameters within an appropriate range, and the various holes are spaced apart from each other and the appropriate edges a sufficient distance. A second example of a custom bracket 1110 is a bracket that would not pass the design check as the component 1110 may be deemed neither structurally sufficient nor manufacturable. The component 1100 includes a hole in the vertical surface that is open to an edge thereof. The system may provide feedback to the user of the issue (open hole, hole too large for vertical portion) and may provide potential solutions to the issue (increase size of vertical portion, reduce size of hole).

A third example of a custom bracket 1120 is a bracket that would not pass the design check. For example, engineering best practices may suggest that the center of a hole should be a certain distance (e.g., at least one and a half diameters) from the edge of the component. Thus, while the hole in the vertical portion may be sufficiently sized for the size of the vertical portion, the placement of the hole is positioned too close to the edge. A fourth example of a custom bracket 1130 is a bracket that would not pass the design check. For example, engineering best practices may suggest that the centers of holes within a same surface should be a certain distance (at least one and a half diameters) from each other. The orientation of the holes on the horizontal surface are too close to one another (the holes actually overlap).

The example of components that fail the design check is not limited to those illustrated in FIG. 11 or the design rules described therein. Rather these examples are limited in scope for simplistic explanation, but could be applied in various situations, across any number of known or derived standards, best practices, guidelines, or the like.

Figure 12:
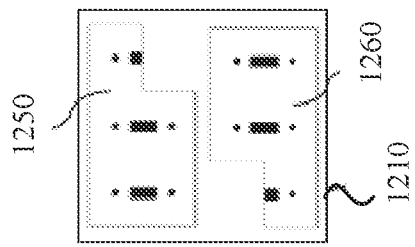
FIG. 12 illustrates a custom component that it is determined does not fit within the build envelop of the manufacturing machine (3D printer), according to one embodiment.
Figure 12:
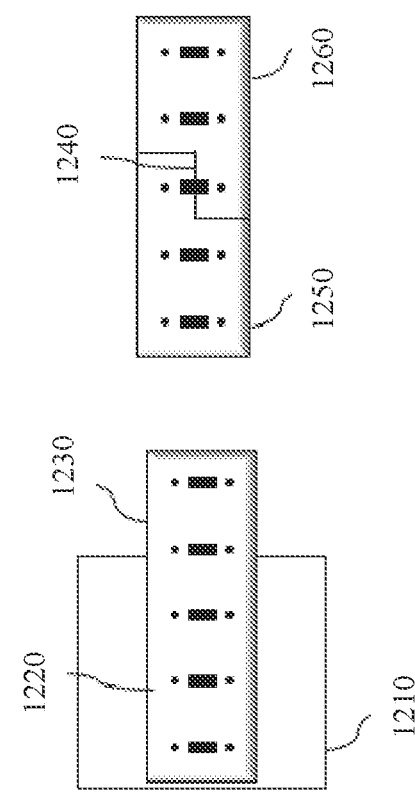
Figure 12:
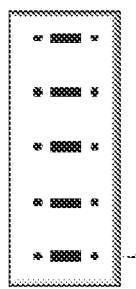

FIG. 12 illustrates a custom component 1200 that it is determined does not fit within the build envelop (460 No of FIG. 4) of the manufacturing machine (3D printer). The custom component 1200 is a switch plate cover having five switch openings (a five-gang switch). The five-gang switch 1200 is larger than the build envelope 1210. As illustrated, a first portion 1220 is within the build envelope 1210 and a second portion 1230 is outside the build envelope. After determining that the five-gang switch 1200 does not fit within the build envelop (460 No of FIG. 4) as a single model, a determination is made as to whether the model can be split into multiple models that would fit with the build envelope (470 of FIG. 4) without increasing the risk of the part once manufactured for its application. The primary role of a switch plate cover is to seal and contain the wires from contact from hands, fingers, metallic objects, or the like. As such, the five-gang switch 1200 cannot simply be divided into the first and second portions 1220, 1230 as this would result in a seam through one of the openings. Furthermore, a straight seam between the two pieces may increase the risk of something sliding through the seam.

The plate can be split along a stepped line 1240 to create a first side 1250 and a second side 1260 without compromising the primary role (prevent contact with wires) of the five-gang switch 1200. The split models 1250, 1260 can fit within the build envelope 1210 (470 Yes of FIG. 4) so these models may be saved and used or manufacturing (3-D printing) of the component. Once the split models are manufactured, they can be secured to one another to be utilized as the desired component in the field.

The dynamic inventory system has been described above regarding fairly simple mechanical parts that may be grouped into generic component types and generic configurations thereof and the number of specific parameters that may vary may be fairly limited. However, the system is not limited thereto. Rather the system could be utilized to provide a generic design that may involve specific inputs to meet the performance requirements for the component's application. In the certain cases, there may be components that do not require many variations in the generic component type (configurations) but may alter greatly from one customization to another. For example, in the medical industry there are many patient specific components that are of the same generic type of component but are specifically tailored to the individual patient.

Figure 13:
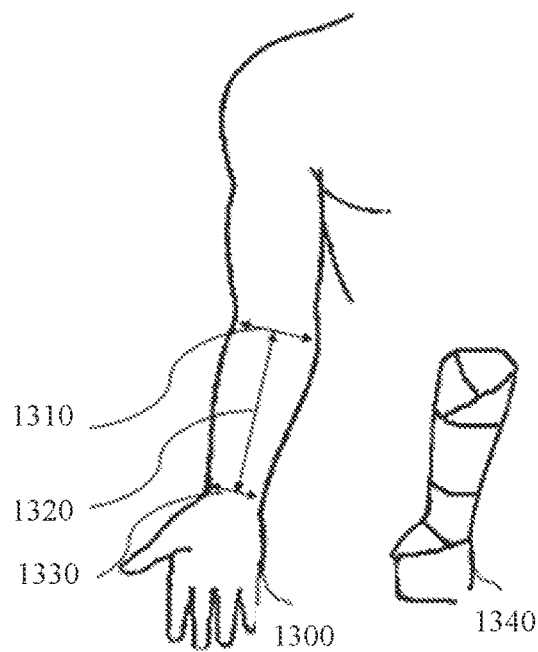
FIG. 13 illustrates an example instance where a generic design may involve specific inputs to meet the performance requirements for the component's application, according to one embodiment.
Figure 13:
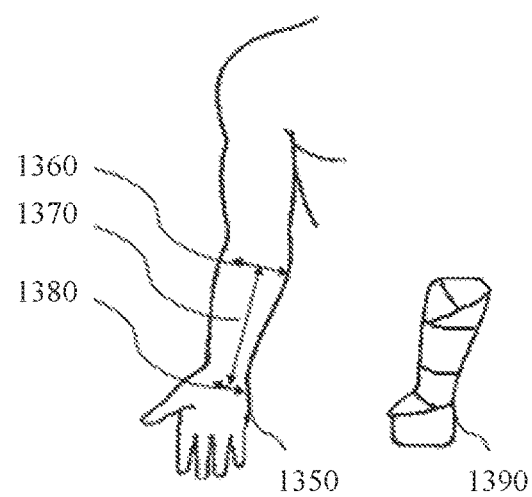

FIG. 13 illustrates the use of the dynamic inventory system in the medical industry to create a forearm brace. The forearm brace may be very basic in terms of the component type but needs to vary greatly from patient to patient. For example, a first patient may have an endomorphic body type 1300 that includes a broad elbow joints 1310, a long forearm 1320, and a large wrist 1330, which results in a brace 1340 that is quite large. However, a second patient may be a shorter person and have an ectomorphic body type 1350 that includes a slender elbow joint 1360, a shorter forearm 1370, and a small wrist 1380, resulting in a much smaller forearm brace 1390.

In this application, there may not be a huge catalog of generic component types (410 of FIG. 4) or subsequent generic configurations (415 of FIG. 4) to select from. However highly advantageous to be able to customize a component to a specific patient based on physical data derived from the individual, whether they be body measurements, 3-D scan data, computerized tomography scans, magnetic resonance imaging, or the like that could be input into the system (420 of FIG. 4). This would enable the rapid design of a patient specific device to be produced on site.

Although the disclosure has been illustrated by reference to specific embodiments, it will be apparent that the disclosure is not limited thereto as various changes and modifications may be made thereto without departing from the scope. The various embodiments are intended to be protected broadly within the spirit and scope of the appended claims.

The invention claimed is:

1. A method for enabling a user to generate a dynamic three-dimensional (3D) model file for a specific component that is needed, the method comprising:
activating a dynamic inventory system;
presenting, on a graphical user interface, the user of the dynamic inventory system with static two-dimensional (2D) images for a plurality of generic components;
receiving a selection from the user of one of the static 2D images of the plurality of generic components that resembles the specific component;
presenting, on the graphical user interface, the user with one or more parameters that need to be defined for the selected static 2D image of the generic component, wherein the selected static 2D image of the generic component and the defined parameters represent the specific component;
receiving the one or more defined parameters for the selected static 2D image of the generic component that represent the specific component;
analyzing the specific component represented by the one or more defined parameters for the selected static 2D image of the generic component against at least some subset of engineering best practices;
generating the dynamic 3D model file for the specific component when the analyzing determines the specific component meets the at least some subset of engineering best practices; and
transmitting the dynamic 3D model file to a manufacturing machine that utilizes the dynamic 3D model file to produce the specific component.

2. The method of claim 1, further comprising the manufacturing machine converting the dynamic 3D model object file into commands for producing the specific component.

3. The method of claim 2, further comprising producing the specific component on the manufacturing machine from the commands for producing the specific component.

4. The method of claim 3, wherein the manufacturing machine is a 3D printer.

5. The method of claim 1, further comprising presenting the user with issues associated with the one or more defined parameters for the selected static 2D image of the generic component when the analysis determines the specific component does not meet the at least some subset of engineering best practices.

6. The method of claim 5, further comprising
presenting, on the graphical user interface, the user with an ability to correct the issues associated with the one or more defined parameters for the selected static 2D image of the generic component; and
receiving the corrected one or more specified parameters from the user.

7. The method of claim 1, further comprising determining if the specific component can be produced as a single piece within a build envelope of the manufacturing machine, wherein the generating the dynamic 3D model file is performed subsequent to a determination the specific component can be produced within the build envelope.

8. The method of claim 7, further comprising
determining if the specific component can be split into two or more pieces without degradation if it cannot be produced as a single piece within the build envelope; and
determining if each of the two or more pieces of the specific component can be produced within the build envelope if the specific component can be split into two or more pieces without degradation, wherein the generating the dynamic 3D model file includes generating an individual dynamic 3D model file for each of the two or more pieces.

9. The method of claim 1, further comprising
presenting, on the graphical user interface, the user with static 2D images of a plurality of generic configurations associated with the selected static 2D image of the generic component; and
receiving a selection from the user of one of the static 2D images of the plurality of generic configurations that resembles the specific component, wherein
the presenting the user with one or more parameters that need to be defined includes presenting the user with one or more parameters that need to be defined for the selected static 2D image of the generic configuration, wherein the selected static 2D image of the generic configuration and the defined one or more parameters represent the specific component.

10. The method of claim 1, further comprising rendering and presenting a static 2D image of the specific component represented by the one or more defined parameters for the selected static 2D image of the generic component to the user on the graphical user interface to enable the user to confirm the rendered static 2D image of the specific component matches the specific component needed, wherein the generating the dynamic 3D model object file is performed subsequent to the user confirming the rendered static 2D image of the specific component matches.

11. A system for enabling a user to generate a dynamic three-dimensional (3D) model file for a specific component that is needed, the system comprising:
a database containing information for a plurality of generic components;
a user interface to enable communications with a user;
a processor; and
a computer readable storage medium storing instructions that when executed by the processor cause the processor to:
activate a dynamic inventory system;
present, on the user interface, the user of the dynamic inventory system with static two-dimensional (2D) images for the plurality of generic components;
receive a selection from the user of one of the static 2D images of the plurality of generic components that resembles the specific component;
present, on the user interface, the user with one or more parameters that need to be defined for the selected static 2D image of generic component, wherein the selected static 2D image of the generic component and the defined parameters represent the specific component;
receive the one or more defined parameters for the selected static 2D image of the generic component that represent the specific component;
analyze the specific component represented by the one or more defined parameters for the selected static 2D image of the generic component against at least some subset of engineering best practices;
generate the dynamic 3D model file for the specific component when the analyzing determines the specific component meets the at least some subset of engineering best practices; and transmit the dynamic 3D model file to a manufacturing machine that utilizes the dynamic 3D model file to produce the specific component.

12. The system of claim 11, further comprising the manufacturing machine to convert the dynamic 3D model object file into commands for producing the specific component.

13. The system of claim 12, wherein the manufacturing machine is a 3D printer.

14. The system of claim 11, wherein the instructions further cause the processor to present the user with issues associated with the one or more defined parameters for the selected static 2D image of the generic component if the analysis determines the specific component does not meet the at least some subset of engineering best practices.

15. The system of claim 11, wherein the instructions further cause the processor to determine if the specific part can be produced within a build envelope of the manufacturing machine, wherein the dynamic 3D model file is generated subsequent to a determination the specific component can be produced within the build envelope.

16. The system of claim 15, wherein the instructions further cause the processor to
determine if the specific component can be split into two or more pieces without degradation if it cannot be produced as a single piece within the build envelope; and
determine if each of the two or more pieces of the specific component can be produced within the build envelope if the specific component can be split into two or more pieces without degradation, wherein the generating the dynamic 3D model file includes generating a dynamic 3D model file for each of the two or more pieces.

17. The system of claim 11, wherein the instructions further cause the processor to
present, on the user interface, the user with static 2D images of a plurality of generic configurations associated with the selected static 2D image of the generic component; and
receive a selection from the user of one of the static 2D images of the plurality of generic configurations that resembles the specific component, wherein
the presenting the user with one or more parameters that need to be defined includes presenting the user with one or more parameters that need to be defined for the selected static 2D image of the generic configuration, wherein the selected static 2D image of the generic configuration and the defined one or more parameters represent the specific component.

18. The system of claim 11, wherein the instructions further cause the processor to render and present a static 2D image of the specific component defined by the one or more defined parameters for the selected static 2D image of the generic component to the user to enable the user to confirm the rendered static 2D image of the specific component matches the specific component needed, wherein the dynamic 3D model file is generated subsequent to the user confirming the rendered static 2D image of the specific component matches.

19. A three-dimensional (3-D) printer enabling a user to manufacture a replacement component to be used in place of a component that needs to be replaced, the 3-D printer comprising
an apparatus for manufacturing the component layer by layer;
a processor coupled to a computer readable storage medium storing instructions that when executed by the processor causes the processor to:
activate a dynamic inventory system;
present, on a user interface, a user of the dynamic inventory system with static two-dimensional (2-D) images for a plurality of generic components that are available for local manufacturing;
receive a selection from the user of one of the static 2-D images of the plurality of generic components that resembles the component that needs to be replaced;
present, on the user interface, the user with one or more parameters that need to be defined for the selected static 2-D image of the generic component, wherein the selected static 2-D image of the generic component is selected and the one or more parameters are defined to represent the component that needs to be replaced;
receive the one or more defined parameters for the selected static 2-D image of the generic component that define the replacement component that can be utilized in place of the component that needs to be replaced;
analyze the replacement component against at least some subset of engineering best practices;
generate a dynamic 3-D model file for the replacement component when the analyzing determines the replacement component meets the at least some subset of engineering best practices; and
convert the dynamic 3-D model file into commands for the apparatus to produce the replacement component.

20. The 3-D printer of claim 19, wherein the instructions further cause the processor to render and present a static 2-D image of the replacement component defined by the one or more defined parameters for the selected static 2D image of the generic component to the user to enable the user to confirm the rendered static 2-D image of the replacement component matches the replacement component needed, wherein the dynamic 3-D model file is generated subsequent to the user confirming the rendered static 2-D image of the replacement component matches.

* * * * *